Jan. 3, 1967 T. EINSELE 3,296,600

MAGNETIC CORE SWITCHING DEVICE

Filed July 17, 1961 4 Sheets-Sheet 1

INVENTOR
THEODOR EINSELE

BY Paul M. Brannen

AGENT

United States Patent Office 3,296,600

Patented Jan. 3, 1967

3,296,600
MAGNETIC CORE SWITCHING DEVICE

Theodor Einsele, Sindelfingen, Germany, assignor to International Business Machines Corporation, New York, N.Y., a corporation of New York Filed July 17, 1961, Ser. No. 124,661
Claims priority, application Germany, Oct. 5, 1956, I 12,283
6 Claims. (Cl. 340—174)

This invention relates to magnetic core switching devices, and particularly to an improved form of magnetic core switching matrix adapted to drive a magnetic core storage matrix.

This application is a continuation-in-part of a U.S. Patent application Serial No. 685,593, filed on September 23, 1957, now abandoned, for Magnetic Core Switching Device, on behalf of Theodor Einsele.

Coincident current magnetic core storage matrices are well-known in which a plurality of bistable magnetic cores are arranged in rectangular coordinates of rows and columns, with row and column driving lines intersecting the cores, so that a particular position or core is selected by supplying energy to the appropriate row and column driving lines, whereby only the core located at the intersection of the selected row and column lines receives sufficient energy to change its state.

In the case of large or high capacity storage matrices, the number of driving units or devices, such as vacuum tube pulse generators, for supplying pulses to the row and column lines becomes excessive if a separate driver is provided for each row and each column.

It has previously been proposed to reduce the number of driving units by providing a row switching matrix and a column switching matrix, each of which has a single driving unit, and suitable switches for energizing selected rows and columns of the switching matrix. For the selection of rows and columns of the storage matrix therefor, one switching matrix is needed for each, the cores of which are designated as switch cores, and the number of which in each switching matrix corresponds to the number of storage rows or columns with which the switching matrix is associated. The switching cores when triggered into their one stable condition supply a pulse of predetermined polarity and size, and when triggered into the original condition again supply a pulse of an opposite polarity and a predetermined amplitude. Therefore, it has been proposed to utilize both pulses for the storage core selection, for example, one for selection during readout, that is, readout of the stored value in the storage matrix, and the other for selection during readin, that is, entry of a value to be stored in the storage matrix. As the storage core selection pulses for readout and readin frequently are required to have different amplitudes, for example, an amplitude ratio of 2:1, the dimensioning of such circuit arrangements leads to difficulties if further requirements such as premagnetization or biasing of the cores for a better utilization of the hysteresis qualities of the core material have to be considered. The present invention decreases such difficulties in switching matrices of the above-described type by the provision that, in addition to the premagnetization or bias customary for obtaining a first stable condition of the switching cores, a counter pulse common to all switching cores is applied in the same direction as the premagnetizing or biasing current, so that only that switching core is triggered into its second stable condition which is simultaneously selected by a row and a column pulse. The counter pulse is applied to all switching cores simultaneously with the column or row selecting pulse. According to another feature of the present invention, the column and line selecting pulses, respectively, are applied to the column and row, respectively, from a pulse source or driver through multiple switches which may be semiconductor switches or transistors. The counter pulse winding which links all of the switch cores is connected in series with one of the two pulse sources or drivers, either the row driver or the column driver, so that for any row or column selection, the counter pulse winding is energized for all switching cores in the matrix.

Prior proposals, such as U.S. Patent 2,734,184, for example, disclose magnetic core switching matrices of the type which utilize a bias or so-called inhibiting coil. However, these references do not disclose the use of an additional biasing magnetizing energy supplied only during the time that the cores are being switched from a first to a second state, which thereby gives a different ratio of the outputs during the read and write portions of the cycle.

The foregoing and other objects, features and advantages of the invention will be apparent from the following more particular description of preferred embodiments of the invention, as illustrated in the accompanying drawings.

In the drawings.

Similar reference characters refer to similar parts in each of the several views.

Figure 1:
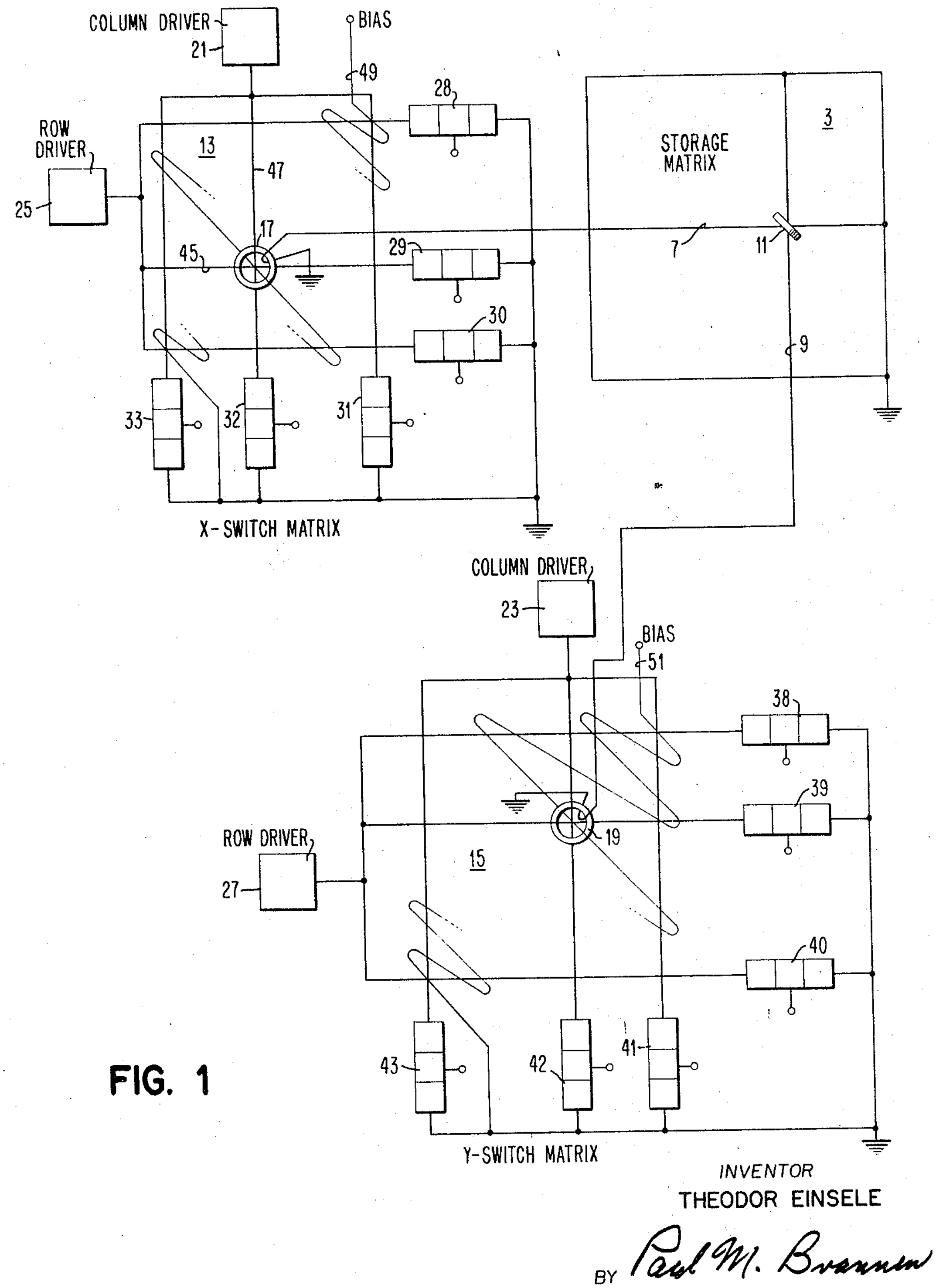
FIG. 1 is a diagrammatic illustration of a known arrangement of magnetic core storage matrix provided with row and column switching matrices, in which the reading and writing currents are in a proportion such as 2:1.

Referring to FIG. 1, there is shown a magnetic core storage matrix 3, which has a plurality of row lines, such as line 7, and a plurality of column driving lines, such as line 9, arranged in rectangular coordinates. At each intersection with the matrix, a magnetic storage core is threaded by the intersecting row and column lines, as illustrated by core 11, threaded by lines 7 and 9. Only one row line, one column line, and one storage core are illustrated, for the sake of clarity. Also, the sense or output windings, bias windings and the like for matrix 3 are not shown, since these form no part of the subject invention and may be arranged in any of several well-known manners.

The row and column driving lines of storage matrix 3 are driven by switch cores in switch core matrices 13 and 15, also designated as the X and Y switch matrix, respectively. Each row line, such as row line 7, is connected to a secondary or output winding on a switch core, such as core 17, in matrix 13, and each column line, such as column line 9, is connected to a secondary or output winding on a switch core, such as core 19, in matrix 15.

Each of the switching matrices 13 and 15 are constructed and arranged in the same fashion, including a common driver or pulse source for all of the column and row lines in the matrix, such as column drivers 21 and 23, and row drivers 25 and 27. Selection of the proper driving lines in the switching matrices is provided by suitable switches, one for each line, such as the transistor switches designated by reference characters 28 through 33, associated with matrix 13, and 38 through 43, associated with matrix 15. Thus to select the core 11 in matrix 3, lines 7 and 9 must be pulsed. Line 7 is pulsed as a result of switches 29 and 32 of matrix 13 being enabled during the time the row and column drivers are effective. The coincident energization of lines 45 and 47 threading core 17 causes this core to change its magnetic state, and the consequent flux change induces a voltage pulse in line 7. The Y matrix 15 operates in similar fashion.

At the termination of the row and column pulses, the bias energy supplied to all the cores in both matrices by the windings 49 and 51 causes the selected switch cores to revert to their initial state, which is a saturated condition beyond their first stable remanent flux state, thus inducing a pulse of opposite polarity on the associated driving line to the storage matrix.

Figure 2:
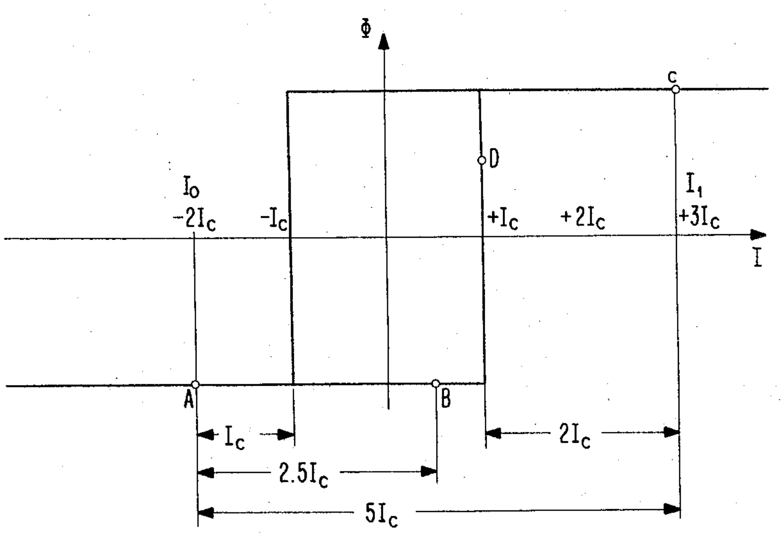
FIG. 2 is an illustration of a hysteresis loop for a magnetic switching core provided with premagnetization or biasing in accordance with known methods.

A hysteresis loop for the switch cores operated as shown in FIG. 1 and described above is illustrated in FIG. 2. The relations of the currents are those required to provide a 2:1 amplitude ratio of the pulses supplied to the storage matrix. The direct current bias, constantly supplied to windings 49 and 51, is designated as $I_o$, so that the initial or resting state of the switch cores is at point A on the hysteresis curve, which shows the core as being in a saturated state beyond the lower stable remanent flux state. A pulse from either the column or row driver alone brings the core to the point B on the hysteresis curve. Assuming ideal magnetic material, it can be seen that there is no change in flux, and hence no induced output to the storage matrix. When both column and row lines are pulsed however, the total coincident current has a value of $5I_c$, as shown in FIG. 2, and the switch core transmits the excess of the coercive current value $I_c$ to the storage matrix, in this case $2I_c$, by transformer action. Whether the point C or point D on the hysteresis loop is reached depends upon the voltage-time integral of the energizing current. When the selection pulses terminate, the direct current bias $I_o$ returns the core to point A, and during this transition, a reversed polarity pulse is induced in the output winding linking the core. For an amplitude ratio of 2:1 the relationship between the currents may be expressed by the equation $-(I_1-I_c)/(I_o+I_c)=2$.

On the condition that point B must lie within the rectangular portion of the hysteresis loop, the resulting limiting or critical values are: $I_o=-3I_c$ and $I_1=+5I_c$.

If these limits are exceeded, then point B lies beyond the bend or knee of the hysteresis loop and the coincident current selective principle is ineffective.

Figure 3:
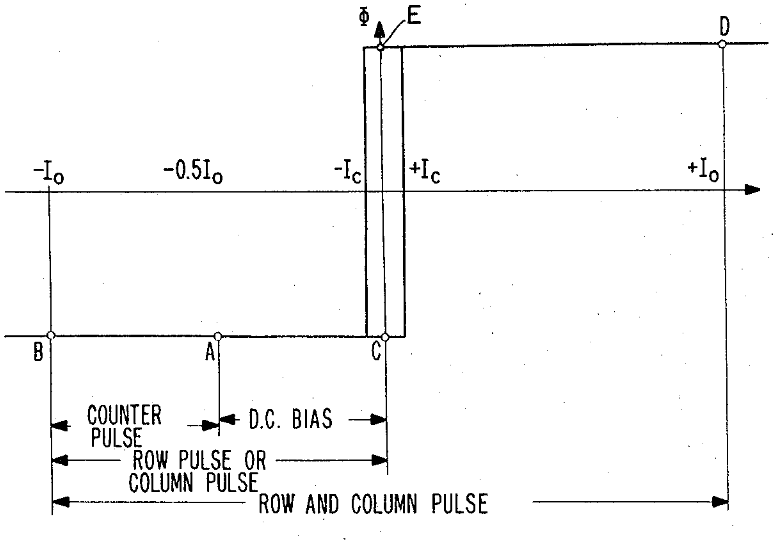
FIG. 3 is a diagram of a hysteresis curve for a magnetic switching core provided with premagnetization or bias and additionally illustrating the effect of the counter pulse supplied to the cores in accordance with the present invention.

The disadvantages of the known arrangement described above, caused by the restricted amplitudes of $I_o$ and $I_1$, are eliminated by the present invention, in which an additional magnetizing force is provided, acting in the same relative direction as the premagnetizing or biasing force, and supplied to each core in the switching matrix concurrently with one or the other of the selection pulses. This counter pulse may be supplied to the cores in any suitable manner, such as by a winding linking all of the cores and energized by the proper magnitude and polarity of current, but preferably by a winding linking all of the cores in the matrix and connected in series to either the row or the column driver with the number of turns properly proportioned to produce the desired results. Operation of such an arrangement is illustrated in FIG. 3, where, as evident from the drawing, the direct current bias normally maintains each core at point A on the hysteresis loop, which may be considered a saturated state beyond the first stable remanent flux state. The counter pulse carries all of the cores in the switching matrix except those on the selected row and column lines to further saturation at point B. The cores on the selected row and on the selected column lines are magnetized to point C, which is the first stable remanent flux state, and the selected core, at the intersection of the selected row and column lines is carried to point D, the second saturated flux state. The second stable remanent flux state is at point E. As shown by the drawing, $I_o$ is much greater than $I_c$, so that even a small fluctuation of the selecting pulse amplitude could jeopardize the selective principle of the matrix, if the counter pulse were not provided.

Figure 4:
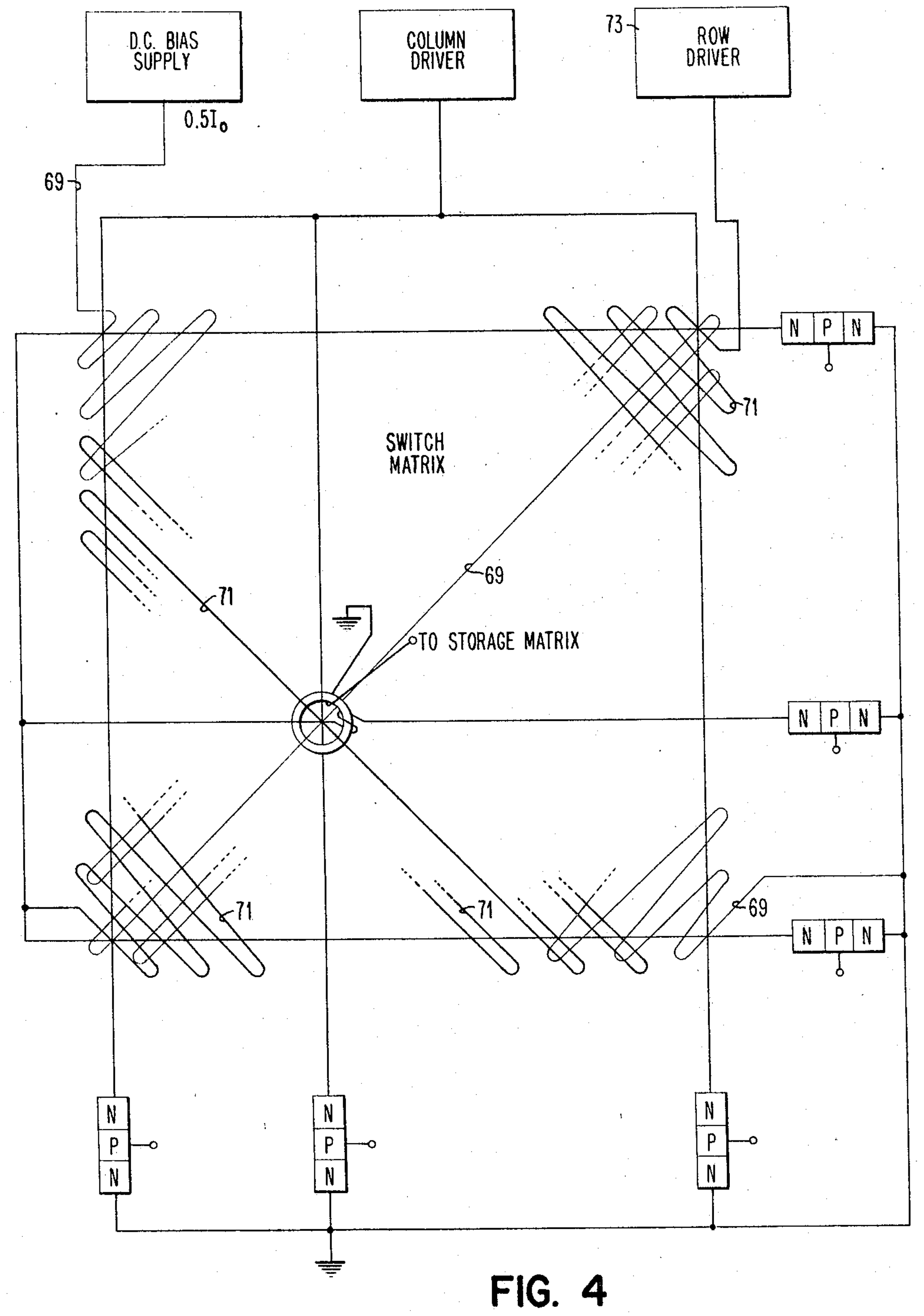
FIG. 4 is a diagrammatic view of the winding of a switching matrix provided with a counter pulse circuit to provide operation as illustrated in FIG. 3.

FIG. 4 shows a switching matrix constructed according to the magnetizing conditions illustrated in FIG. 3. As shown, the bias winding 69 threads each core in the matrix, and the counter pulse winding 71, which also threads all the cores, is connected in series with the row driver 73 and the row windings. The number of turns of each of the row windings on each core is twice that of the number of turns of the counter pulse windings, the reason for which will be subsequently made clear. Only one of the switch cores is shown, in order to simplify the drawing, but it will be obvious that the row and column driving lines, the bias winding and the counter pulse winding thread each core in the matrix in the same manner as shown for the exemplary core.

Figure 5:
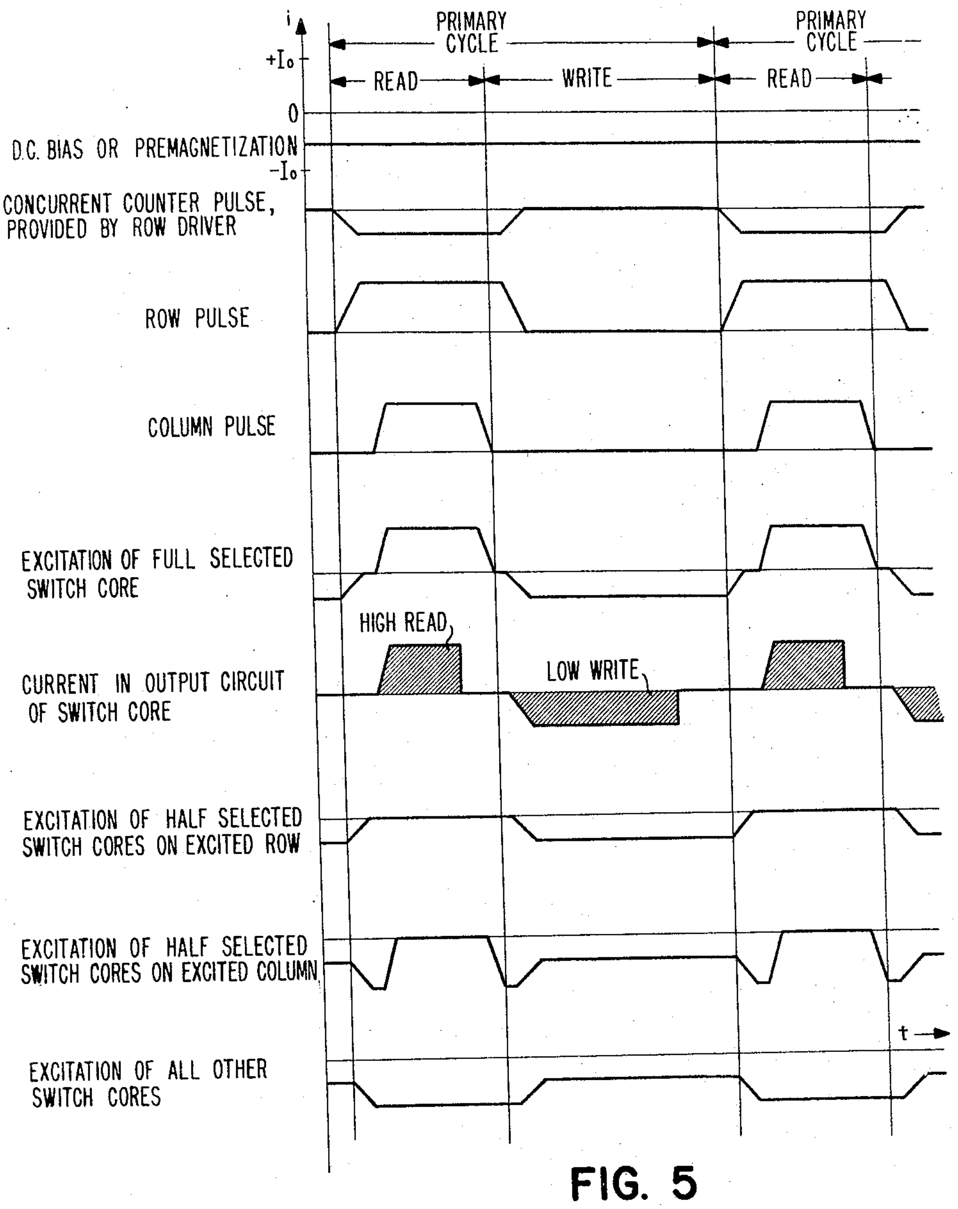
FIG. 5 is a graph illustrating the current and time relationships in the switching matrix illustrated in FIG. 4.

Referring now to FIG. 5, there is shown a diagrammatic illustration of the values of energy encountered at different points in the switching matrix of FIG. 4 during various portions of a complete operating cycle. The energization, or magnetization of the various cores is illustrated in terms of a basic value which may be considered to be $I_o$, with a single turn winding. The D.C. bias or premagnetization is shown as being constant at a value of $-0.5I_o$. During each read cycle, the counter pulse, co-existent with the row pulse, has a value of $-5I_o$, while the row pulse has a value equal to $+I_o$, the difference in magnitude being accomplished by using twice the number of turns for the row windings as for the counter pulse windings, as shown in FIG. 4. The column pulses, which occur during read time, have a value of $+I_o$.

The full selected core, i.e., the core at the intersection of the selected row and column lines is energized to a value equal to $+I_o$ during the time that both the row and column pulses exist. The $+I_o$ value of the row pulse may be considered as cancelling the $-0.5I_o$ bias and $-0.5I_o$ counter pulse, so that the net excitation of the full-selected core is equal to that of the column pulse, $+I_o$. This relatively high value of excitation provides a high read current value in the output circuit of the switch core, as shown.

On the excited row and the excited column, during read time, the row and column pulses respectively will balance out the bias and the counter pulse, so that net excitation is zero, as indicated in FIG. 5. All other switch cores have the counter pulse added to the bias causing these cores to saturate further in the first or normal direction.

At termination of the row and column pulses, the write portion of the cycle begins. With all of the magnetizing forces except the bias removed, the full selected core is now biased to return to its first state, and this return provides the low write pulse shown during the write time of the primary cycle. The remainder of the cores are energized at this time to a value of—0.510, and since they are still in the initial saturation range, no output occurs from these cores.

It is apparent from the foregoing that the use of a counter pulse, applied to all cores concurrently with one of the selection pulses and polarized to aid the bias energization provides a unique combination which provides high read and low write currents without rendering the current tolerances of the drivers more stringent.

Figure 6:
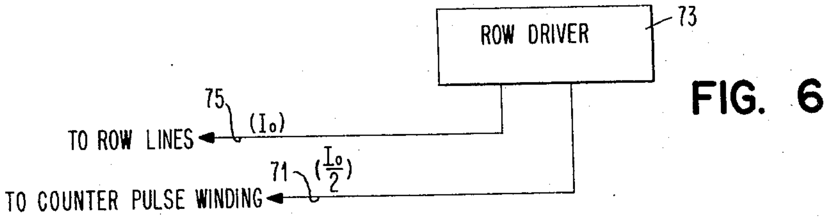
FIG. 6 is a diagrammatic illustration of a modification of the arrangement shown in FIG. 4 which permits the same number of turns for all windings on the cores.

FIG. 6 is a diagrammatic illustration of a modification of the arrangemnt shown in FIG. 4. In the modification, the row drive lines 75 and the counter pulse line 71 are separately connected to the row driver 73, which driver is arranged in any suitable fashion to supply twice the value of current to the row driving lines 75 as is supplied to the counter pulse line 71. If this arrangement is employed, then it is obvious that all of the windings on the switch cores can have the same number of turns.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A magnetic core matrix comprising a plurality of bistable magnetic cores having first and second saturated flux states, said cores being arranged in rows and columns, a row driving line for each row threading each core in the associated row, a column driving line for each column threading each core in the associated column, biasing means for normally biasing each core in the matrix to said first saturated state, driving means for concurrently energizing a selected row driving line and a selected column driving line to thereby magnetize the core at the intersection of the selected lines to its second saturated flux state, and counter pulse means effective only during energization of said driving lines for supplementing the magnetization provided by said biasing means.

2. A magnetic core matrix comprising a plurality of bistable magnetic cores having first and second saturated flux states, said cores being arranged in rows and columns, a row driving line for each row threading each core in the associated row, a column driving line for each column threading each core in the associated column, row driver means and column driver means for supplying pulses of magnetizing energy to said row and column driving lines, biasing means for normally biasing each core in the matrix to said first saturated state, switching means for selectively connecting said row driver means to a selected one of said row driving lines and selectively connecting said column driver means to a selected one of said column driving lines to thereby magnetize the core at the intersection of the selected row and column driving lines to its second saturated flux state, and means energized from one of said driver means for supplementing the magnetization produced by said biasing means.

3. A magnetic core matrix comprising a plurality of bistable magnetic cores having first and second saturated flux states, said cores being arranged in rows and columns, a row driving line for each row threading each core in the associated row, a column driving line for each column threading each core in the associated column, row driver means and column driver means for supplying pulses of magnetizing energy to said row and column driving lines, biasing means including a biasing winding threading each of said cores for normally biasing each core in the matrix to said first saturated state, switching means for selectively connecting said row driver means to a selected one of said row driving lines and selectively connecting said column driver means to a selected one of said column driving lines to thereby magnetize the core at the intersection of said selected row and column driving lines to said second saturated flux state, and means energized from one of said driver means for supplementing the magnetization produced by said biasing means.

4. A magnetic core matrix comprising a plurality of bistable magnetic cores having first and second saturated flux states, said cores being arranged in rows and columns, a row driving line for each row threading each core in the associated row, a column driving line for each column threading each core in the associated column, row driver means and column driver means for supplying pulses of magnetizing energy to said row and column driving lines, biasing means including a biasing winding threading each of said cores for normally biasing each core in the matrix to said fi st saturated flux state, switching means for selectively connecting said row driver means to a selected one of said row driving lines and for selectively connecting said column driver means to a selected one of said column driving lines to thereby magnetize the core at the intersection of said selected row and column driving lines to said second saturated flux state, and a counter pulse winding threading each core in the matrix and connected to one of said driver means for supplementing the magnetization produced by said biasing means.

5. A magnetic core matrix comprising a plurality of bistable magnetic cores having first and second saturated flux states, said cores being arranged in rows and columns, a row driving line for each row threading each core in the associated row, a column driving line for each column threading each core in the associated column, row driver means and column driver means for supplying pulses of magnetizing energy to said row and column driving lines, biasing means including a biasing winding threading each of said cores for normally biasing each core in the matrix to said first saturated flux state, switching means for selectively connecting said row driver means to a selected one of said row driving lines and for selectively connecting said column driver means to a selected one of said column driving lines to thereby magnetize the core at the intersection of said selected row and column driving lines to its second saturated flux state, and a counter pulse winding connected in series with one of said driver means and the associated driving lines, said counter pulse winding threading each core in the matrix and providing a supplemental magnetization to said cores with the same relative polarity as that produced by said biasing means.

6. A magnetic core switching matrix comprising a plurality of bistable magnetic cores having first and second saturated flux states, said cores being arranged in rows and columns, a row driving line for each row threading each core in the associated row, a column driving line for each column threading each core in the associated column, a row driver, a column driver, switching means for selectively connecting said row driving lines to said row driver and for selectively connecting said column driving line to said column driver, a source of direct current bias energy, a biasing winding connected to said source and threading each core in the matrix to thereby normally magnetize said cores to said first saturated flux state, and a counter pulse winding connected in series with one of said drivers and the associated driving lines and threading each core in the matrix, effective when energized to supplement the magnetization produced by said biasing winding.

References Cited by the Examiner

UNITED STATES PATENTS

| | | | |
|---|---|---|---|
| 2,734,184 | 2/1956 | Rajchman | 307—88 |
| 2,898,581 | 8/1959 | Post | 340—174 |
| 2,923,923 | 2/1960 | Raker | 340—174 |
| 2,939,119 | 5/1960 | Einsele | 340—174 |

JAMES W. MOFFITT, *Acting Primary Examiner.*

IRVING SRAGOW, *Examiner.*

M. S. GITTES, *Assistant Examiner.*